UNITED STATES PATENT OFFICE.

WALTER O. SNELLING, OF ALLENTOWN, PENNSYLVANIA, ASSIGNOR TO TROJAN POWDER COMPANY, OF NEW YORK, N. Y., A CORPORATION OF NEW YORK.

EXPLOSIVE.

1,386,438.     Specification of Letters Patent.     Patented Aug. 2, 1921.

No Drawing.     Application filed August 6, 1919. Serial No. 315,675.

*To all whom it may concern:*

Be it known that I, WALTER O. SNELLING, a citizen of the United States, and resident of Allentown, Lehigh county, Pennsylvania, have invented certain Improvements in Explosives, of which the following is a specification.

This invention relates to explosives containing nitrostarch, or other nitrated carbohydrate, and water, and the object of the invention is to provide means for increasing the stability of such explosives.

In the manufacture of nitrostarch explosives, it has been found that the inclusion in the mixture of a sufficient amount of water to thoroughly wet the nitrostarch grains, has the effect of rendering the explosive relatively insensitive to blows or friction, and that the desired wet condition of the nitrostarch may be maintained by the addition to the mixture of a substance soluble in water and having sufficient affinity therefor to prevent ready evaporation of the water when the mixture is exposed to the air, an example of such substance being ammonium nitrate. Explosive mixtures containing nitrostarch and water with and without ammonium nitrate are described in an application filed by me October 3rd, 1918, under Serial No. 256,736.

In the presence of water, however, and more particularly in the presence of an aqueous solution of ammonium nitrate, nitrostarch tends to undergo hydrolysis at elevated temperatures, leading to decomposition, so that as compared with a dry mixture of properly stabilized nitrostarch and ammonium nitrate, a corresponding wet mixture has less stability.

I have discovered that the tendency toward hydrolysis and decomposition of the wet mixtures referred to may be overcome by the presence in the mixture of hydroxid of zinc and that this agent may be added to the mixture either in the form of hydroxid itself or may be obtained in the mixture by the addition of zinc oxid, in which case the oxid appears to take up some of the water present to form the hydroxid. The presence of such agent in the wet mixture has the effect, as I have discovered, of preventing the hydrolysis before referred to, and results in a marked increase in the stability of the mixture.

As specific examples of explosive mixtures made in accordance with my invention I may instance the following:

| | |
|---|---|
| Nitrostarch | 50% |
| Ammonium nitrate | 39% |
| Water | 8% |
| Zinc oxid | 3% | or

| | |
|---|---|
| Nitrostarch | 45% |
| Ammonium nitrate | 43% |
| Water | 8% |
| Zinc hydroxid | 4% |

These examples are illustrative merely, as I find that satisfactory results can be obtained with mixtures containing from 20% to 60% nitrostarch, 60% to 20% ammonium nitrate, and 3% to 15% of water by adding thereto from 1% to 5% of the zinc compound which I prefer to add in the form of the oxid.

In making up the mixture the ingredients are added and mixed together in any suitable manner. Where ammonium nitrate is employed it can, if desired, be dissolved in the water, and the solution then added to nitro-starch and zinc compound with proper mixing.

As a substitute for zinc hydroxid for the purpose described I may employ the hydroxid of cadmium, with which I have obtained satisfactory results. Where the cadmium compound is employed, the effect of preventing the hydrolyzing action is somewhat less in degree than in the case of the zinc compounds, and accordingly a greater amount of the cadmium compound should be employed, say from 3% to 10%. As in the case of the zinc compound, the cadmium agent may be originally added either in the form of the oxid or of the hydroxid. In the former case, the agent takes the form of hydroxid by reason of the presence of water in the mixture.

While in the foregoing description I have referred primarily to the use of my invention in connection with nitro-starch mixes, I do not, in its broadest aspect, wish to be confined thereto, as the hydroxids mentioned are applicable for preventing hydrolysis of wet mixtures containing other nitric acid esters of carbohydrates, such for example as nitro-cellulose, the agents being employed with other nitrated carbohydrates in substantially the same manner as hereinabove described in connection with nitrostarch.

The oxids or hydroxids which I have found suitable for the purpose described are those of zinc and cadmium, elements heavier than magnesium in the magnesium sub-group according to the classification of Mendelejeff. The wet mixtures to which my invention relates are those in which water is present in substantial amount and in which therefore the hydrolyzing action hereinabove noted will take place unless counteracted. Said mixtures may be characterized as containing water in excess of 3%, and the term "wet nitro-starch" where employed in the claims, has reference to mixtures containing water in said amount.

I claim:

1. An explosive comprising a nitrated carbohydrate, water in excess of three per cent., and an hydroxid of a metal of the magnesium group having an atomic weight greater than that of magnesium.

2. An explosive comprising nitro-starch, water in excess of three per cent., and an hydroxid of a metal of the magnesium group having an atomic weight greater than that of magnesium.

3. An explosive comprising nitro-starch, water in excess of three per cent., and hydroxid of zinc.

4. An explosive comprising a nitrated-carbohydrate, water in excess of three per cent., and hydroxid of zinc.

5. An explosive comprising a nitrated carbohydrate, water in excess of three per cent., ammonium nitrate, and an hydroxid of a metal of the magnesium group having an atomic weight greater than that of magnesium.

6. An explosive comprising nitro-starch, water in excess of three per cent., ammonium nitrate, and an hydroxid of a metal of the magnesium group having an atomic weight greater than that of magnesium.

7. An explosive comprising nitro-starch, water in excess of three per cent., ammonium nitrate, and hydroxid of zinc.

8. An explosive comprising a nitrated carbohydrate, water in excess of three per cent., ammonium nitrate, and hydroxid of zinc.

9. An explosive comprising from 20% to 60% of nitro-starch, from 3% to 15% of water, and 1% to 5% of zinc hydroxid.

10. An explosive mixture comprising 20% of nitrated carbohydrate, 3% of water and 1% of zinc hydroxid.

11. An explosive mixture comprising from 20% to 60% nitrostarch, 20% to 60% of ammonium nitrate, 3% to 15% of water, and 1% to 5% of zinc hydroxid.

12. In the manufacture of explosives, the process which comprises adding to an explosive containing nitrostarch and water an oxid capable of uniting with part of the water present to form an hydroxid having the effect of preventing hydrolysis of the nitrostarch.

13. In the manufacture of explosives, the process which comprises adding to an explosive containing nitrostarch, water and ammonium nitrate an oxid capable of uniting with part of the water present to form an hydroxid having the effect of preventing hydrolysis of the nitrostarch.

14. In the manufacture of explosives the process which comprises adding to an explosive containing wet nitro-starch an oxid of a metal of the magnesium group having an atomic weight greater than that of magnesium, said oxid uniting with water present to form an hydroxid preventing hydrolysis of the nitrosarch.

15. In the manufacture of explosives the process which comprises adding to an explosive containing wet nitrostarch zinc oxid, said oxid uniting with water present to form an hydroxid preventing hydrolysis of the nitro-starch.

16. The method of stabilizing wet nitrostarch which consists in adding thereto an oxid of a metal of the magnesium group having an atomic weight greater than that of magnesium.

17. The method of stabilizing wet nitrostarch which consists in adding thereto zinc oxid.

WALTER O. SNELLING.